(12) United States Patent
Glasgow et al.

(10) Patent No.: US 8,914,433 B2
(45) Date of Patent: Dec. 16, 2014

(54) PUBLISH-SUBSCRIPTION PLATFORMS FOR ALERT MESSAGES AND RELATED METHODS AND COMPUTER PROGRAM PRODUCTS

(75) Inventors: Jay Glasgow, Acworth, GA (US); Charles Frederick Hart, Atlanta, GA (US); Jeff David Dodgen, Atlanta, GA (US); Michael Glenn Branam, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1168 days.

(21) Appl. No.: 11/858,250

(22) Filed: Sep. 20, 2007

(65) Prior Publication Data
US 2008/0147737 A1    Jun. 19, 2008

Related U.S. Application Data (60) Provisional application No. 60/846,029, filed on Sep. 20, 2006.

(51) Int. Cl.
*G06F 15/16* (2006.01)
*G06F 17/30* (2006.01)
*G08B 27/00* (2006.01)
*H04W 4/02* (2009.01)

(52) U.S. Cl.
CPC .......... *G06F 17/3087* (2013.01); *G08B 27/005* (2013.01); *H04W 4/02* (2013.01)
USPC ....................................................... 709/201

(58) Field of Classification Search
CPC ........ H04W 4/02; G08B 27/00; G08B 27/005
USPC .......... 709/206, 217, 238, 227, 201; 455/404, 455/422.1, 456.1, 466, 518, 404.1, 456.2; 379/265.09, 37–51; 370/392, 503; 340/286.06, 539.16, 7.58, 7.59, 506, 340/534; 375/272
See application file for complete search history.

(56) References Cited

U.S. PATENT DOCUMENTS

| | | | | |
|---|---|---|---|---|
| 5,903,726 | A * | 5/1999 | Donovan et al. | 709/206 |
| 5,917,887 | A * | 6/1999 | Fesler et al. | 379/48 |
| 5,995,553 | A * | 11/1999 | Crandall et al. | 375/272 |
| 6,323,767 | B1 * | 11/2001 | Gropper | 340/534 |
| 6,628,938 | B1 * | 9/2003 | Rachabathuni et al. | 455/456.3 |
| 6,842,774 | B1 * | 1/2005 | Piccioni | 709/207 |
| 6,909,903 | B2 * | 6/2005 | Wang | 455/456.1 |
| 7,277,018 | B2 * | 10/2007 | Reyes et al. | 340/573.1 |
| 7,324,515 | B1 * | 1/2008 | Chapman | 370/392 |
| 7,406,507 | B2 * | 7/2008 | Piccioni | 709/207 |

(Continued)

OTHER PUBLICATIONS

Muson et al. Location-based notification as a general-purpose service. Tech. International Workshop on Mobile Commerce, 2002.*

(Continued)

*Primary Examiner* — Imad Hussain
(74) *Attorney, Agent, or Firm* — Myers Bigel Sibley & Sajovec, PA (57) ABSTRACT

An alert delivery system includes a publish-subscription platform that is configured to receive alert messages from one or more sources. The publish-subscription platform is further configured to publish the alert messages to client devices based on matches between geographic locations respectively associated with ones of the alert messages and geographic locations respectively associated with ones of the client devices.

20 Claims, 4 Drawing Sheets

(56) References Cited

U.S. PATENT DOCUMENTS

| | | | |
|---|---|---|---|
| 7,557,689 B2* | 7/2009 | Seddigh et al. | 340/286.06 |
| 7,558,558 B2* | 7/2009 | Langsenkamp et al. | 455/404.1 |
| 7,592,912 B2* | 9/2009 | Hasek et al. | 340/539.16 |
| 7,602,277 B1* | 10/2009 | Daly et al. | 340/438 |
| 2001/0034223 A1* | 10/2001 | Rieser et al. | 455/404 |
| 2002/0118118 A1* | 8/2002 | Myllymaki et al. | 340/686.1 |
| 2002/0150226 A1* | 10/2002 | Gallant et al. | 379/210.02 |
| 2003/0060214 A1* | 3/2003 | Hendrey et al. | 455/456 |
| 2003/0069002 A1* | 4/2003 | Hunter et al. | 455/404 |
| 2004/0067773 A1* | 4/2004 | Rachabathuni et al. | 455/560 |
| 2004/0150518 A1* | 8/2004 | Phillips et al. | 340/500 |
| 2004/0193617 A1* | 9/2004 | Adler | 707/100 |
| 2004/0266389 A1* | 12/2004 | Kennedy | 455/404.1 |
| 2005/0009508 A1* | 1/2005 | Graske et al. | 455/414.3 |
| 2005/0013417 A1* | 1/2005 | Zimmers et al. | 379/37 |
| 2005/0020242 A1* | 1/2005 | Holland et al. | 455/404.2 |
| 2005/0162267 A1* | 7/2005 | Khandelwal et al. | 340/506 |
| 2005/0212504 A1* | 9/2005 | Revital et al. | 324/100 |
| 2005/0227676 A1* | 10/2005 | De Vries | 455/414.1 |
| 2005/0238023 A1* | 10/2005 | Robertson et al. | 370/392 |
| 2006/0088028 A1* | 4/2006 | Leiber et al. | 370/352 |
| 2006/0111112 A1* | 5/2006 | Maveddat | 455/439 |
| 2006/0133582 A1* | 6/2006 | McCulloch | 379/45 |
| 2006/0142024 A1* | 6/2006 | Thalanany et al. | 455/456.1 |
| 2006/0174014 A1* | 8/2006 | Bae | 709/227 |
| 2006/0246920 A1* | 11/2006 | Shim | 455/456.2 |
| 2007/0100960 A1* | 5/2007 | Eichstaedt et al. | 709/217 |
| 2007/0136743 A1* | 6/2007 | Hasek et al. | 725/33 |
| 2007/0155416 A1* | 7/2007 | Donnellan | 455/518 |
| 2007/0161382 A1* | 7/2007 | Melinger et al. | 455/456.1 |
| 2007/0165789 A1* | 7/2007 | Hulls | 379/37 |
| 2007/0206773 A1* | 9/2007 | Branam | 379/265.09 |
| 2007/0238455 A1* | 10/2007 | Zhu et al. | 455/422.1 |
| 2007/0263669 A1* | 11/2007 | Maginity et al. | 370/503 |
| 2007/0270164 A1* | 11/2007 | Maier et al. | 455/456.2 |
| 2007/0282959 A1* | 12/2007 | Stern | 709/206 |
| 2008/0004051 A1* | 1/2008 | Sylvain | 455/466 |
| 2008/0034114 A1* | 2/2008 | Ducey et al. | 709/238 |
| 2008/0059998 A1* | 3/2008 | McClenny et al. | 725/33 |
| 2008/0268875 A1* | 10/2008 | Holland et al. | 455/456.6 |
| 2009/0093237 A1* | 4/2009 | Levenshteyn et al. | 455/412.1 |
| 2010/0042696 A1* | 2/2010 | Vella et al. | 709/206 |

OTHER PUBLICATIONS

Bhatia et al. VTAssist: a location-based feedback notification system for the disabled. Tech. ACM Southeast Regional Conference, 2006.*

"Home Location Register Specification." European Telecommunication Standard Institute, Jan. 2002. Web. <www.etsi.org/deliver/etsi_gts/11/ . . . /gsmts_1131sv030201p.pdf>.*

* cited by examiner

PUBLISH-SUBSCRIPTION PLATFORMS FOR ALERT MESSAGES AND RELATED METHODS AND COMPUTER PROGRAM PRODUCTS

RELATED APPLICATION

This application claims the benefit of and priority to U.S. Provisional Patent Application No. 60/846,029, filed Sep. 20, 2006, the disclosure of which is hereby incorporated herein by reference as if set forth in its entirety.

BACKGROUND OF THE INVENTION

The present invention relates generally to communication networks and, more particularly, to delivering services via communication networks.

The Emergency Alert System (EAS) is a national broadcast warning system that is jointly administered by the Federal Communications Commission (FCC), Federal Emergency Management Agency (FEMA), and the National Weather Service. Voluntary EAS systems also exist at the state and local levels. An EAS message consists of four parts: a header, an attention signal, an audio announcement, and an end-of-message marker. The header contains information about who originated the alert, e.g., President, state/local authorities, National Weather Service, etc., a short description of the event, the geographic areas affected, the expected duration of the event, the date and time the alert was issued, and an identification of the originating transmission station. EAS decoders parse the header to decide whether to ignore the alert or whether to broadcast the alert to the local area associated with the decoder based on the geographic information contained in the header. The header is followed by the attention signal, which is a combination of two sine waves of different frequencies. After the attention signal, a voice message follows that describes the details of the alert. The EAS message concludes with an end-of-message marker. The FCC requires that all broadcast stations install and maintain EAS decoders and encoders to monitor signals from other broadcast stations for EAS messages and to broadcast EAS messages as appropriate.

Figure 1:
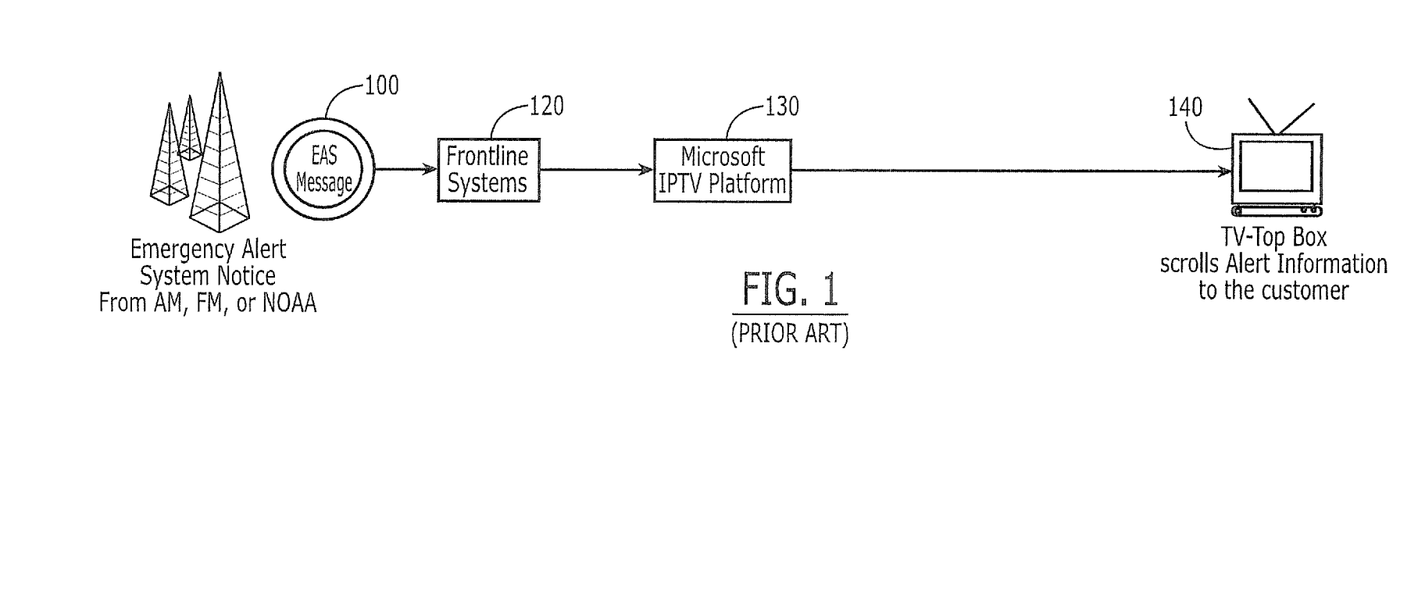
FIG. 1 is a block diagram that illustrates a conventional Emergency Alert System network.

FIG. 1 illustrates a conventional EAS network. As shown in FIG. 1, an EAS message 100 is transmitted from a source, such as a national, state, or local authority, and is received by an EAS decoder 120. An example EAS decoder may be provided by Vela Frontline™ brand decoders available from Vela Corporation, Clearwater Fla. The EAS decoder 120 may be configured to process the analog EAS message 100, which includes the header, attention signal, audio announcement, and end-of-message marker, and convert it into, for example, one or more Extensible Markup Language (XML) files for transmission into an Internet Protocol Television (IPTV) platform 130. IPTV is a system where digital television service is delivered using the Internet over, typically, a broadband network infrastructure. One such IPTV platform that can be used as the IPTV platform 130 in FIG. 1 is Microsoft TV IPTV Edition™ available from Microsoft Corporation, Redmond, Wash. Microsoft TV IPTV Edition is an integrated and comprehensive software platform developed specifically to deliver broadcast-quality video and new, integrated TV services over broadband networks.

The digital EAS message may, thus, be delivered to a customer's TV via a set-top box 140 using the IPTV platform 130 so as to display the alert information on the customer's TV. FIG. 1 illustrates one example of delivering an EAS message over an IPTV platform to a customer's TV. EAS messages can be broadcast to recipients using a variety of media, including, but not limited to, AM/FM radio, VHF/UHF television, cable television, wireless cable television, digital television, digital cable, and satellite radio. In general, as can be seen from FIG. 1 and the accompanying discussion, EAS messages are typically broadcast into a network and delivered directly to a client device.

SUMMARY

According to some embodiments of the present invention, an alert delivery system includes a publish-subscription platform that is configured to receive alert messages from one or more sources. The publish-subscription platform is further configured to publish the alert messages to client devices based on matches between geographic locations respectively associated with ones of the alert messages and geographic locations respectively associated with ones of the client devices.

In other embodiments of the present invention, the publish subscription platform includes a publish-subscription message platform that is configured to receive the alert messages from the one or more alert sources and to publish the alert messages to the client devices. A Web server may be communicatively coupled to the publish-subscription message platform and may be configured to compare the geographic locations associated with the alert messages with the geographic locations associated with the client devices to determine which ones of the alert messages are published to which ones of the client devices.

In still other embodiments, a gateway may be configured to facilitate communication between Internet Protocol (IP) client devices and the publish-subscription message platform and/or the Web server.

In still other embodiments, the gateway may be configured to translate between Web Services Description Language (WSDL) messages and Session Initiation Protocol (SIP) messages.

In still other embodiments, an authentication server may be communicatively coupled to the Web server and may be configured to authenticate the client devices and to obtain the geographic locations associated with the client devices therefrom.

In still other embodiments, a home subscriber server (HSS) database may be communicatively coupled to the authentication server and may be a repository for IP address information roaming information, and/or telephony services information associated with the client devices. A home location register (HLR) may be communicatively coupled to the authentication server and may be a repository for registration information, call settings, subscribed features, location information directory information, mobility management information, and/or identification information associated with the client devices. A customer identify store (CIS) may be communicatively coupled to the authentication server and may be a repository for the geographic location information associated with the client devices.

In still other embodiments of the present invention, the authentication server is further configured to convert the geographic locations obtained from the client devices into Federal Information Processing Standard (FIPS) codes and to store the FIPS codes associated with the client devices in the CIS.

In still other embodiments of the present invention, the authentication server is further configured to authenticate customers of Web services and to store authentication information associated with the Web services customers in the HSS, HLR, and/or CIS.

In still other embodiments of the present invention, the authentication server is further configured to provide the Web services customers authentication information to Web services providers that have leased the authentication information.

In still other embodiments of the present invention, the publish-subscription message platform is further configured to publish the alert messages to the client devices using Simple Mail Transfer Protocol (SMTP).

In still other embodiments of the present invention, a decoder is communicatively coupled to the publish-subscription platform and is configured to convert analog alert messages to digital alert messages. The publish-subscription platform is configured to receive the digital alert messages.

In further embodiments of the present invention, alerts are delivered in a communication network by receiving alert messages from one or more sources. The alert messages are published to client devices based on matches between geographic locations respectively associated with ones of the alert messages and geographic locations respectively associated with ones of the client devices.

In still further embodiments of the present invention, publishing the alert messages includes comparing the geographic locations associated with the alert messages with the geographic locations associated with the client devices and publishing the alert messages to the client devices based on the comparison of geographic locations associated with the alert messages with the geographic locations associated with the client devices.

In still further embodiments of the present invention, publishing the alert messages to the client devices includes translating between Web Services Description Language (WSDL) messages and Session Initiation Protocol (SIP) messages.

In still further embodiments of the present invention, the method further includes authenticating the client devices to obtain the geographic locations associated with the client devices therefrom.

In still further embodiments of the present invention, authenticating the client devices includes converting the geographic locations obtained from the client devices into Federal Information Processing Standard (FIPS) codes, and storing the FIPS codes associated with the client devices in an information repository.

In still further embodiments of the present invention, authenticating the client devices includes authenticating customers of Web services and storing authentication information associated with the Web services customers in an information repository.

In still further embodiments of the present invention, authenticating the client devices includes providing the Web services customers authentication information to Web services providers that have leased the authentication information.

In still further embodiments of the present invention, publishing the alert messages includes publishing the alert messages to the client devices using Simple Mail Transfer Protocol (SMTP).

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems/networks, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

As used herein, the term "IP terminal or device" refers to a terminal or device that may communicate using the session initiation protocol (SIP). It will be understood that an IP terminal or device may also refer to devices that communicate using SIP via a media gateway, which translates communications, for example, between an IP network and another network, such as the public switched telephone network or a circuit switched wireless network.

As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

Some embodiments of the present invention are described herein with respect to delivery and processing of Emergency Alert System (EAS) messages. It will be understood that the present invention is not limited to such embodiments, but, on the contrary, the principles of the present invention can be applied to other alert sources, such as Amber alerts, crime alerts, sexual predator alerts, in other embodiments of the present invention.

Some embodiments of the present invention stem from a realization that alerts, such as EAS messages, can be delivered via a publish-subscription platform. Broadly stated, a user can authenticate a client device to the publish-subscription platform and then subscribe to one or more alerts. When an alert is received, the publish-subscription platform can publish the alert so that it is available to any authenticated subscriber for which the alert is relevant, e.g., is associated with the same geographic area as the subscriber. To determine the relevancy of an alert for a particular subscriber the publish-subscription platform can compare the geographic information contained in, for example, an alert message with the geographic information obtained from a client device when authenticating the client device. The alert message can then be published to those subscribing devices whose geographic authentication information matches the geographic information in the alert message.

Figure 2:
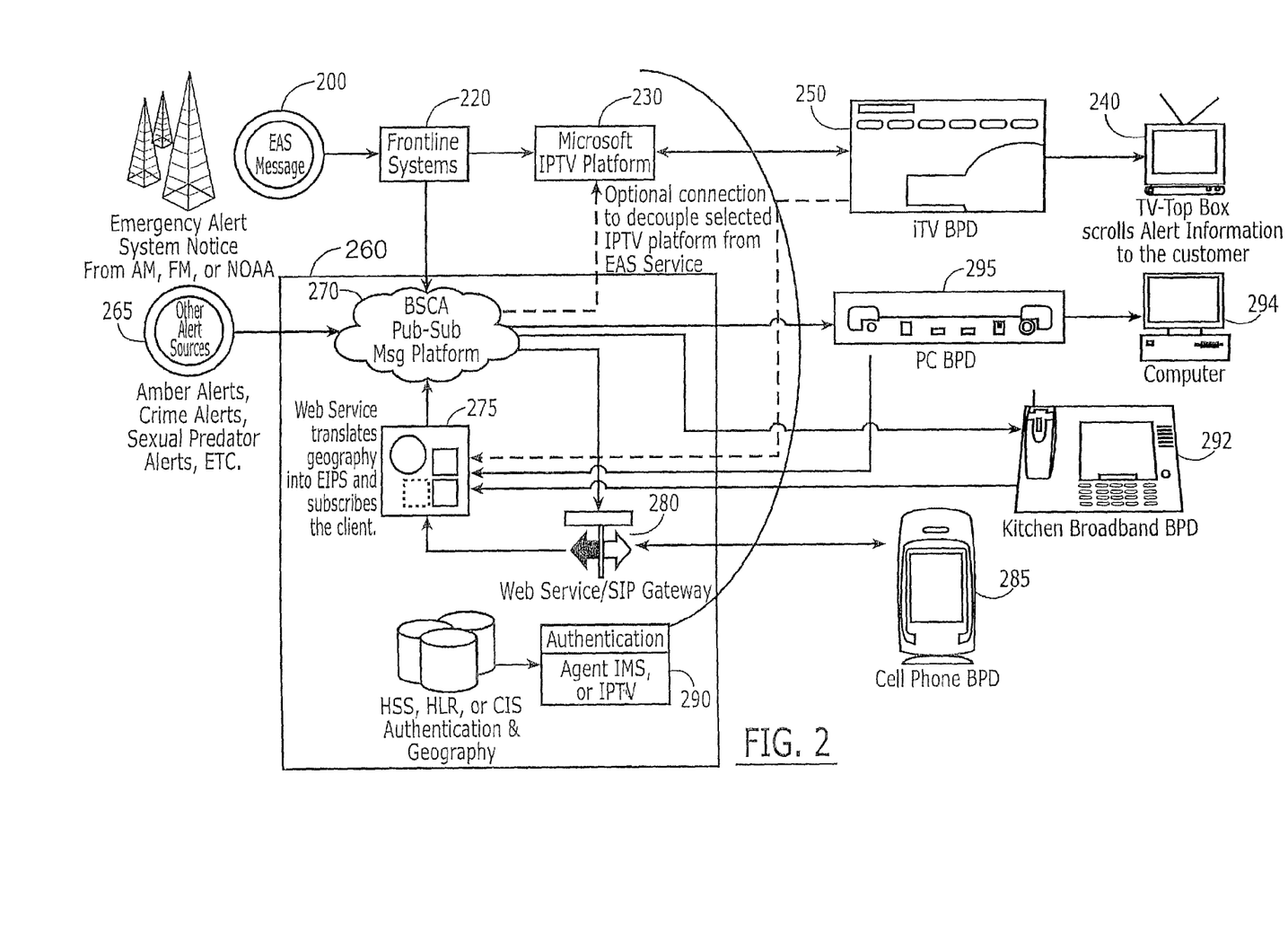
FIG. 2 illustrates a communication network that includes a publish-subscription platform for alerts in accordance with some embodiments of the present invention.

FIG. 2 illustrates a communication network that includes a publish-subscription platform for alerts in accordance with some embodiments of the present invention. As shown in FIG. 2, an EAS message can be broadcast and received by an EAS decoder, which converts the analog EAS message to, for example, a digital format, such as one or more Extensible Markup Language (XML) files, for transmission into an Internet Protocol Television (IPTV) platform 230 as discussed above. Conventionally, the EAS message can be delivered to a customer's TV via a set-top box 240 using the IPTV platform 230 so as to display the alert information on the customer's TV. In some embodiments, a service provider may wish to provide their own user interface to their customer via personal desktop/device-top software rather than use the user interface provided by, for example, third-party application software. Accordingly, a service provider may provide personal desktop/device-top software 250 as an interface for managing received alert messages and other services via the IPTV set-top box 240.

In accordance with some embodiments of the present invention, the communication network includes a publish-subscription platform 260 that is configured to receive EAS alert messages from one or more EAS decoders 220 along with other types of alerts from other sources 265, such as Amber alerts, crime alerts, sexual predator alerts, etc. The publish-subscription platform 260 includes a publish-subscription message platform 270 that is configured to receive incoming alert messages from alert sources and to provide the alert messages to client devices that have subscribed to the alert service.

The publish-subscription message platform 270 communicates with Web servers 275 that are configured to subscribe client devices and to translate/compare geography information obtained from an alert message with geography information obtained from a client device during authentication to determine which alerts should be published to which client devices that have subscribed to the alert message service.

The Web servers 275 communicate with a Web Service/SIP gateway 280 to communicate with Internet Protocol (IP) multimedia subsystem (IMS) based client devices. The IMS standard has been developed to define the control and integration of multimedia services in a core, packet-switched network. In particular, the IMS architecture defines a set of logical functions that use a signaling protocol known as SIP. SIP is used to establish communication sessions in an IP network. For example, a session may be a one-to-one voice call or a session may be more complex, such as one-to-many conference calls involving multimedia services. SIP may also be used to facilitate voice over IP (VoIP) services, in which voice is transported in IP data packets that are re-assembled and converted into an audio signal for the recipient. By using VoIP, network operators may use the same IP infrastructure to carry voice traffic that is used to carry data traffic. Thus, IMS may be summarized as a standardized way to connect IP devices and networks using SIP.

While the IMS architecture uses the SIP protocol to establish communication sessions, Web services generally use different protocols to establish communication sessions and support transactions. For example, a Web service may be described generally as a software system that is designed to support machine-to-machine interaction over a network. The interface may be described in a format such as the Web Services Description Language (WSDL), which is an Extensible Markup Language (XML) based service description on how to communicate using the Web service. Other systems may communicate with the Web service in a manner described by its WSDL interface using messages that may be enclosed in a SOAP envelope. SOAP is a protocol for exchanging XML messages over a network typically using the Hypertext Transfer Protocol (HTTP). Software applications written in various programming languages and running on various platforms may use Web services via a service delivery platform (SDP), such as the publish-subscription platform 260, to exchange information over a network, such as the Internet. Unfortunately, services created for an SDP environment may not necessarily work or work as efficiently in an IMS environment.

The Web Service/SIP gateway 280, according to some embodiments of the present invention, may include software that simulates SIP for the benefit of an IP terminal client device, such as the cell phone 285. The Web Service/SIP gateway 280 may translate SIP messages into, for example, WSDL/XML messages, which are communicated to the Web servers 275 using SOAP and HTTP. This allows the SIP/IMS client device 285 to access a Web service, such as an alert service, provided by the publish-subscription platform 260. In other embodiments, personal desktop/device-top software running on the cell phone 285 may communicate directly with the Web service software running on the Web servers 275 such that SIP is merely used as a communication transport layer. In these embodiments, the Web Service/SIP gateway 280 need not perform any translation.

The publish-subscription platform 260 further includes an authentication server 290 that is configured to authenticate the various client devices, such as the TV set-top box 240, cell phone 285, broadband phone 292, and computer 294. As shown in FIG. 2, the broadband phone 292 may include personal desktop/device-top software and the computer 294 may include personal desktop/device-top software 295 to allow a service provider to provide an interface for managing received alert messages and other services via the various client devices. The authentication server 290 may cooperate with various authentication databases/systems, such as a home subscriber server (HSS) database that maintains a service profile and other information for each end-user and associated SIP/IMS terminal/device that has registered with the publish-subscription platform 260. The profile and other information may include, but is not limited to, IP address information, roaming information, and/or telephony services information. The authentication server 290 may cooperate with at least one service control point (SCP), which manages a home location register (HLR) for the publish-subscription platform 260. The HLR is a database that contains information, such as registration information, call settings, subscribed features, location information, directory information, identification information, and/or other information concerning mobile terminals that are subscribed to the publish-subscription platform 260. The HLR is also used to authenticate mobile terminals and to support mobility management features to which the user of a mobile terminal has subscribed when that user is roaming. Furthermore, the authentication server 290 may cooperate with a customer identity store (CIS) that contains geographic information for various ones of the client devices that may subscribe to one or more services offered by the publish-subscription platform 260.

The various elements of the publish-subscription platform 260 may be connected by a global network, such as the Internet or other publicly accessible network. Various elements of the network may be interconnected by a wide area network, a local area network, an Intranet, and/or other private network, which may not accessible by the general public. Thus, the publish-subscription platform 260 may represent a combination of public and private networks or a virtual private network (VPN). Although FIG. 2 illustrates an exemplary communication network, it will be understood that the present invention is not limited to such configurations, but is intended to encompass any configuration capable of carrying out the operations described herein.

Computer program code for carrying out operations of the publish-subscription platform 260 discussed above with respect to FIG. 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. In some embodiments, the computer program code may include commercially available applications and/or components provided by third parties. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, alarm systems, and/or computer program products in accordance with some embodiments of the invention.

These flowchart and/or block diagrams further illustrate exemplary operations of operating a publish-subscription platform in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
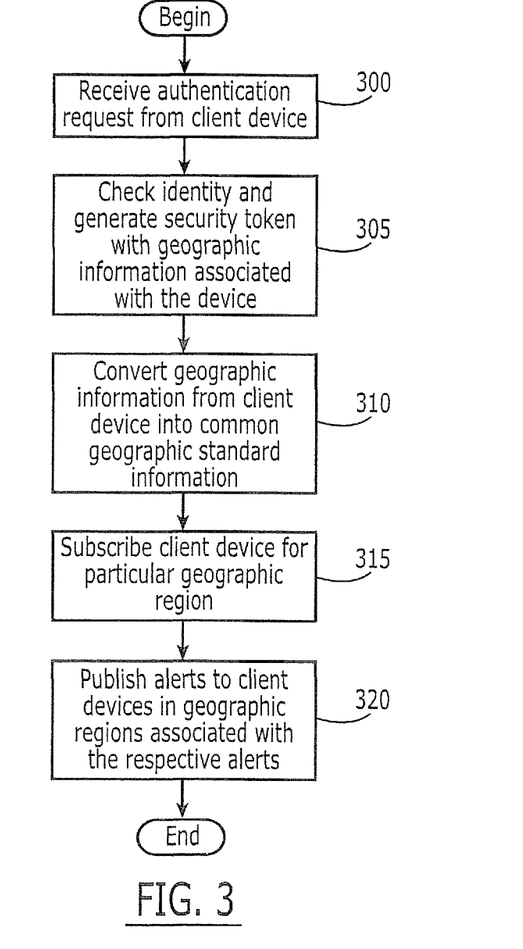
FIG. 3 illustrates operations of the communication network of FIG. 2 in accordance with some embodiments of the present invention.

Referring now to FIG. 3 and FIG. 2, operations for authenticating a client device, subscribing that device to a Web service, such as an alert service provided by the publish-subscription platform 260 of FIG. 2, and publishing the alerts to the various client devices begin at block 300 where an authorization request from a client device is received at the authentication server 290. The authorization server 290 cooperates with the appropriate database/system, e.g., HSS, HLR, and/or CIS, to check the identity of the client device using, for example, a user name and password at block 305. Moreover, the authentication server 290 obtains geographic information, such as address information, from the client device and/or the databases/systems HSS, HLR, and/or CIS. This geographic information associated with the client device is placed into a security token, for example, and provided to the Web servers 275.

At block 310, the geographic information associated with the client device may be converted into a common geographic information standard. For example, the client device geographic information may be converted into Federal Information Processing Standard (FIPS) codes that are commonly used by EAS messages to identify particular geographic regions within the United States, for example. The Web servers 275 may then subscribe the client device for a particular geographic region at block 315.

When alerts are received at the publish-subscription message platform 270, the Web servers 275 may compare the geographic information contained in the header of the alert message, for example, and then publish the alert message via the publish-subscription message platform 270 to those client devices that are subscribed for the geographic area identified in the alert message at block 320. In some embodiments, the publish-subscription message platform 270 may publish the alert messages to the client devices using the Simple Mail Transfer Protocol (SMTP). In other embodiments, the Web servers 275 may distinguish between various published alerts/messages by associating priority levels with various published messages.

The flowchart of FIG. 3 illustrates the architecture, functionality, and operations of embodiments of methods, systems/networks, and/or computer program products for operating a publish-subscription platform. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Figure 4:
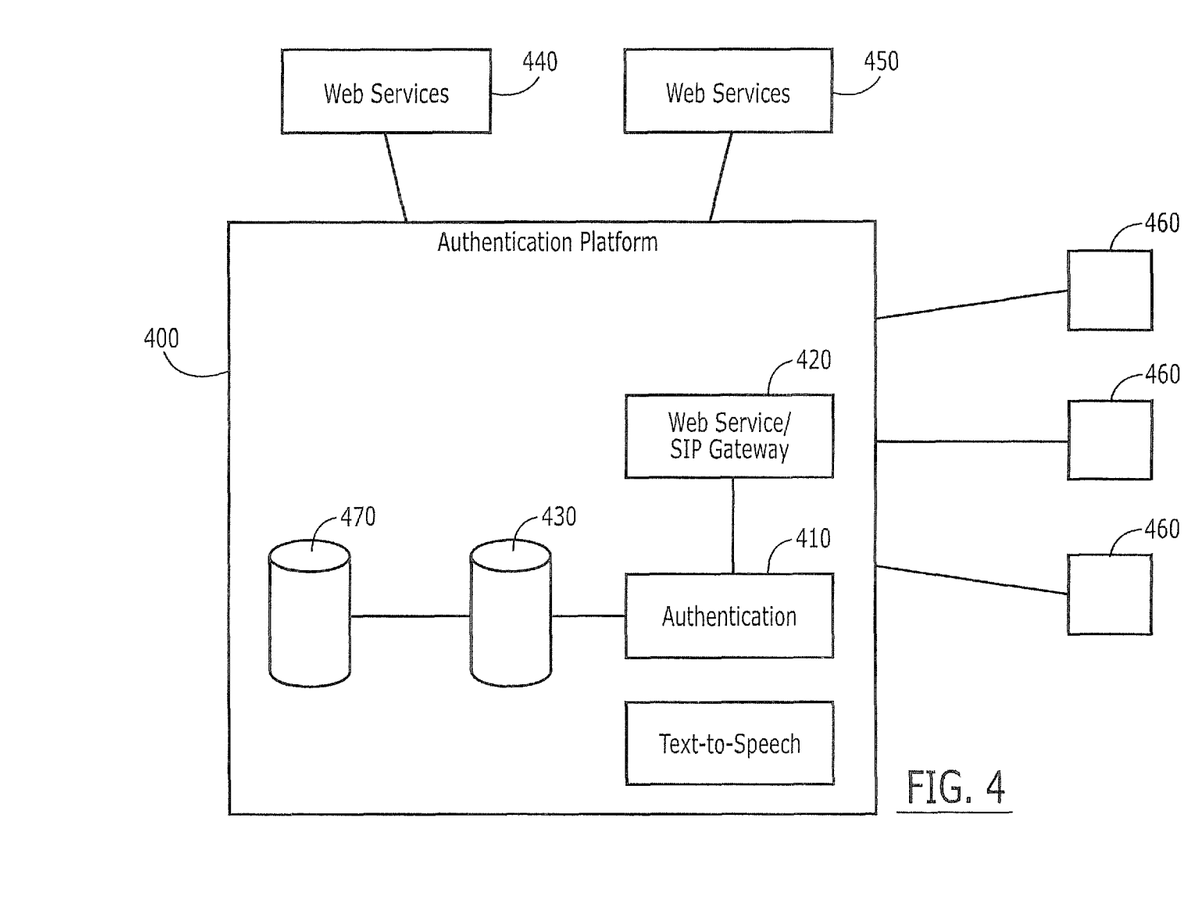
FIG. 4 is a block diagram that illustrates an authentication platform in accordance with some embodiments of the present invention.

Referring now to FIG. 4, various sub-components of the publish-subscription platform 260 of FIG. 2 may be used as an authentication platform 400. For example, the authentication platform 400 may include an authentication server 410, a Web Service/SIP gateway 420, and databases/systems 430, e.g., HSS, HLR, and/or CIS, which may provide the same functionality discussed above with respect to FIG. 2. In the embodiments illustrated in FIG. 4, however, the authentication platform 400 may be used to provide authentication services to numerous organizations that provide Web services as illustrated by Web servers 440 and 450. These organizations may wish to pay for another organization to provide them with authentication services so that they need not maintain the software and infrastructure required to authenticate their customers. In this regard, the authentication provider becomes a lessor of authentication information for numerous client devices 460, such as phones, computers, TVs, etc. Moreover, the authentication platform 400 may provide authentication services for multiple communication transport types. The authentication platform 400 may include a database 470 that can identify all of the various client devices to be authenticated by geographic information, phone number, IP address, etc. The authentication platform 400 may also provide a text-to-speech function that may allow a Web service provider to have the HTTP text information from the Web service converted to speech for delivery to a client device, such as a phone, or other device with a speaker.

In concluding the detailed description, it should be noted that many variations and modifications can be made to the exemplary embodiments without substantially departing from the principles of the present invention. All such variations and modifications are intended to be included herein within the scope of the present invention, as set forth in the following claims.

That which is claimed:

1. A method, comprising:
receiving alert messages from an alert source, the alert messages comprising an analog alert message;
converting the analog alert message to a digital alert message;
publishing the alert messages to client devices based on matches between geographic locations respectively associated with ones of the alert messages and geographic locations respectively associated with ones of the client devices and based on whether the client devices have subscribed to the alert messages;
authenticating using an authentication server the client devices using session initiation protocol to obtain the geographic locations associated with the client devices;
authenticating using the authentication server customers of Web services; and
storing authentication information associated with the Web services customers in an information repository;
wherein the alert messages are not associated with an incoming call from a calling device.

2. The method of claim 1, wherein the publishing the alert messages comprises:
comparing the geographic locations associated with the alert messages with the geographic locations associated with the client devices;
publishing the alert messages to the client devices based on comparing the geographic locations associated with the alert messages with the geographic locations associated with the client devices.

3. The method of claim 2, further wherein publishing the alert messages to the client devices comprises:
translating between Web Services Description Language messages and Session Initiation Protocol messages.

4. The method of claim 1, wherein authenticating the client devices comprises:
converting the geographic locations obtained from the client devices into Federal Information Processing Standard codes; and
storing the Federal Information Processing Standard codes associated with the client devices in an information repository.

5. The method of claim 1, wherein the information repository comprises one of:
a home subscriber server database that is a repository for IP address information roaming information, and telephony services information associated with the client devices;
a home location register that is a repository for registration information, call settings, subscribed features, location information directory information, mobility management information, and identification information associated with the client devices; and
a customer identity store that is a repository for the geographic locations associated with the client devices.

6. The method of claim 1, wherein authenticating the client devices comprises:
providing the authentication information associated with the Web services customers to Web services providers that have leased the authentication information.

7. The method of claim 2, wherein publishing the alert messages comprises:
publishing the alert messages to the client devices using Simple Mail Transfer Protocol.

8. A system, comprising:
a processor; and
a memory coupled to the processor and comprising computer readable program code that when executed by the processor causes the processor to perform operations comprising:
receiving alert messages from an alert source, the alert messages comprising an analog alert message;
converting the analog alert message to a digital alert message;
publishing the alert messages to client devices based on matches between geographic locations respectively associated with ones of the alert messages and geographic locations respectively associated with ones of the client devices and based on whether the client devices have subscribed to the alert messages;
authenticating using an authentication server the client devices using session initiation protocol to obtain the geographic locations associated with the client devices;
authenticating using the authentication server customers of Web services; and
storing authentication information associated with the Web services customers in an information repository;
wherein the alert messages are not associated with an incoming call from a calling device.

9. The system of claim 8, wherein publishing the alert messages comprises:
comparing the geographic locations associated with the alert messages with the geographic locations associated with the client devices;
publishing the alert messages to the client devices based on comparing the geographic locations associated with the alert messages with the geographic locations associated with the client devices.

10. The system of claim 9, wherein publishing the alert messages comprises:
publishing the alert messages to the client devices using Simple Mail Transfer Protocol.

11. The system of claim 9, further wherein publishing the alert messages to the client devices comprises:
translating between Web Services Description Language messages and Session Initiation Protocol messages.

12. The system of claim 8, wherein authenticating the client devices comprises:
converting the geographic locations obtained from the client devices into Federal Information Processing Standard codes; and
storing the Federal Information Processing Standard codes associated with the client devices in an information repository.

13. The system of claim 8, wherein the information repository comprises one of:
a home subscriber server database that is a repository for IP address information roaming information, and telephony services information associated with the client devices;
a home location register that is a repository for registration information, call settings, subscribed features, location information directory information, mobility management information, and identification information associated with the client devices; and
a customer identity store that is a repository for the geographic locations associated with the client devices.

14. The system of claim 8, wherein authenticating the client devices comprises:
providing the authentication information associated with the Web services customers to Web services providers that have leased the authentication information.

15. A computer program product, comprising:
a non-transitory computer readable memory comprising computer readable program code that when executed by a processor causes the processor to perform operations comprising:
receiving alert messages from an alert source, the alert messages comprising an analog alert message;
converting the analog alert message to a digital alert message;
publishing the alert messages to client devices based on matches between geographic locations respectively associated with ones of the alert messages and geographic locations respectively associated with ones of the client devices and based on whether the client devices have subscribed to the alert messages;
authenticating using an authentication server the client devices using session initiation protocol to obtain the geographic locations associated with the client devices;
authenticating using the authentication server customers of Web services; and
storing authentication information associated with the Web services customers in an information repository;
wherein the alert messages are not associated with an incoming call from a calling device.

16. The computer program product of claim 15, wherein publishing the alert messages comprises:
comparing the geographic locations associated with the alert messages with the geographic locations associated with the client devices;
publishing the alert messages to the client devices based on comparing the geographic locations associated with the alert messages with the geographic locations associated with the client devices.

17. The computer program product of claim 16, wherein publishing the alert messages comprises:
publishing the alert messages to the client devices using Simple Mail Transfer Protocol.

18. The computer program product of claim 16, further wherein publishing the alert messages to the client devices comprises:
translating between Web Services Description Language messages and Session Initiation Protocol messages.

19. The computer program product of claim 15, wherein authenticating the client devices comprises:
converting the geographic locations obtained from the client devices into Federal Information Processing Standard codes; and
storing the Federal Information Processing Standard codes associated with the client devices in an information repository.

20. The computer program product of claim 15, wherein the information repository comprises one of:
a home subscriber server database that is a repository for IP address information roaming information, and telephony services information associated with the client devices;
a home location register that is a repository for registration information, call settings, subscribed features, location information directory information, mobility management information, and identification information associated with the client devices; and
a customer identity store that is a repository for the geographic locations associated with the client devices.

* * * * *